United States Patent [19]

Siedlecki

[11] Patent Number: 5,364,157
[45] Date of Patent: Nov. 15, 1994

[54] REINFORCED CARGO DOOR ASSEMBLY

[75] Inventor: Tadeusz J. Siedlecki, Dearborn, Mich.

[73] Assignee: Ford Motor Company, Dearborn, Mich.

[21] Appl. No.: 172,967

[22] Filed: Dec. 27, 1993

[51] Int. Cl.⁵ .............................................. B60J 5/04
[52] U.S. Cl. ................... 296/146.6; 296/146.9
[58] Field of Search ............. 296/146.5, 146.6, 146.9, 296/188

[56] References Cited

U.S. PATENT DOCUMENTS

| | | | |
|---|---|---|---|
| 3,788,686 | 1/1974 | Rossie et al. | 296/146.6 |
| 3,819,228 | 6/1974 | Cornacchia | 296/146.9 |
| 3,944,278 | 3/1976 | Takahashi et al. | |
| 3,964,208 | 6/1976 | Renner et al. | 296/146.6 X |
| 4,013,317 | 3/1977 | Reidelback et al. | |
| 4,307,911 | 12/1981 | Paulik | 296/146.6 X |
| 4,438,969 | 3/1984 | Kamijo et al. | |
| 4,747,629 | 5/1988 | Miller. | |
| 4,917,433 | 4/1990 | Tomforde | 296/146.9 X |
| 4,936,621 | 6/1990 | Skimoda et al. | |

FOREIGN PATENT DOCUMENTS

| | | | |
|---|---|---|---|
| 3425776 | 1/1986 | Germany | 296/146.6 |
| 3425777 | 1/1986 | Germany | 296/146.6 |
| 57-41209 | 3/1982 | Japan | 296/146.6 |

Primary Examiner—Joseph Pape
Attorney, Agent, or Firm—Daniel M. Stock; Roger L. May

[57] ABSTRACT

A cargo door assembly for pivotally mounted side doors in a van-type vehicle is provided with an improved reinforcing beam. The beam extends vertically along the shut face of one door of the assembly and has structure at its top for mounting the door latch and a hook at its bottom unengageable with the vehicle body at its sill. The beam is wider at its bottom than at its top and presents a simply supported beam to the sidewall of the vehicle, enhancing its capacity to handle lateral loading, including impact loading.

11 Claims, 2 Drawing Sheets

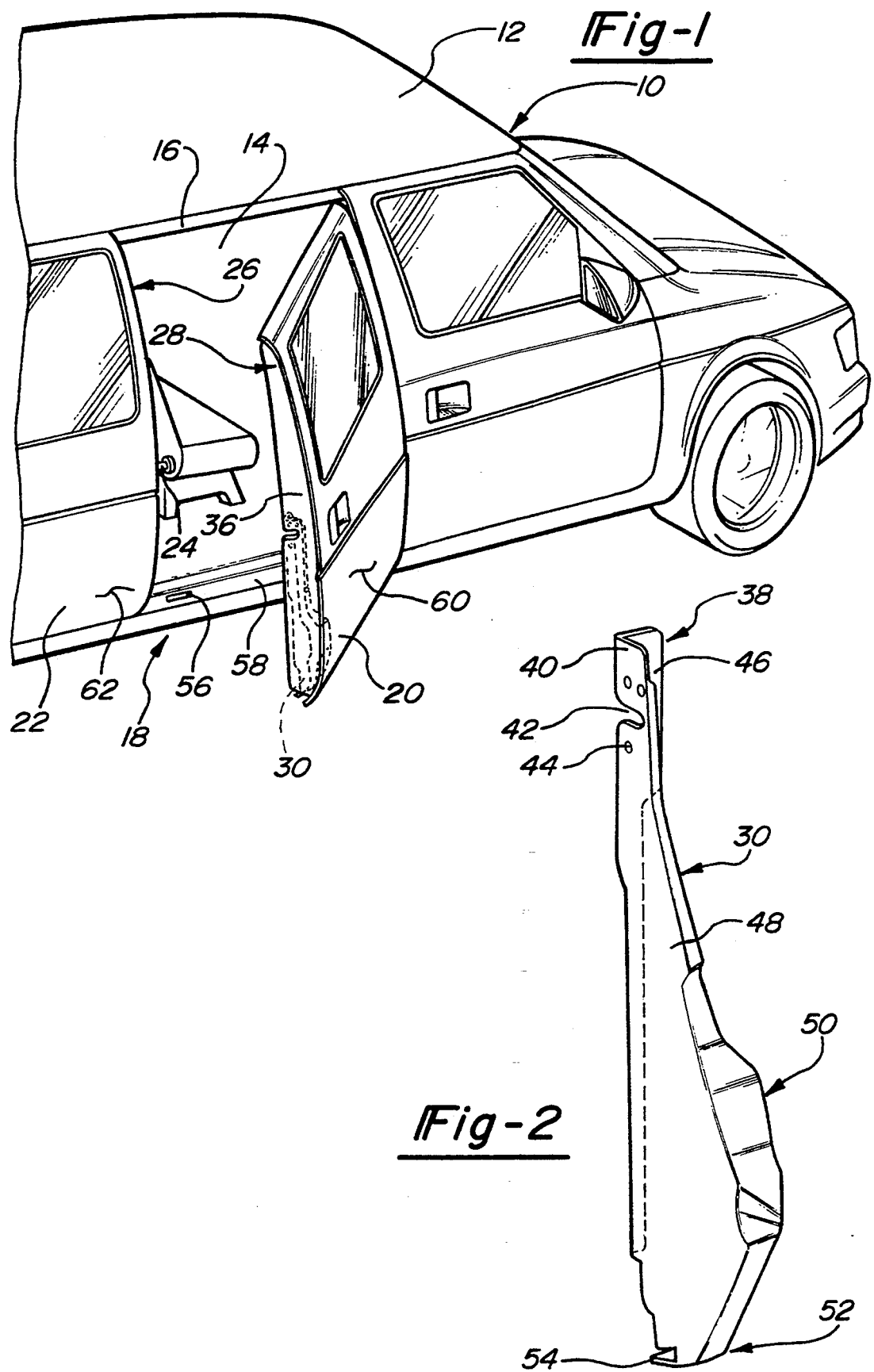

REINFORCED CARGO DOOR ASSEMBLY

BACKGROUND OF THE INVENTION

1. Technical Field

The present invention relates generally to vehicle doors, and more specifically to reinforcement of vehicle doors arranged in the side of van-type vehicles.

2. Description of Related Art

In the manufacture and sale of automotive vehicles of the type generally referred to as vans, it is customary to provide for ingress and egress to rear portions of the vehicle body through a rearwardly placed side door or doors positioned on at least one side of the vehicle. The doors are generally of two types: sliding doors and center opening, outwardly swinging cargo doors.

Engineering development activity relating to the resistance of body structures of the these van-type vehicles to the imposition of external forces has resulted in the establishment of certain design goals for enhancing the resistance of side vehicle structures to the imposition of such loads, particularly impact loads.

It is known in the prior art to provide reinforcing structure for side doors of vehicles. Particularly well-known are generally horizontally running reinforcing beams in passenger vehicles; U.S. Pat. No. 4,013,317 is exemplary of such designs. It is also known to reinforce side cargo doors in vans through interengaging structure disposed between the two doors. applicant's co-pending U.S. application No. 07/997,067 now U.S. Pat. No. 5,297,841 discloses such an approach. The prior art, however, while effective for its intended purpose, reinforces through structure not self-contained in the door and does not make use of the load supporting strength provided by other portions of the vehicle body. In applicant's other design, which is the subject of the co-pending application '067, the reinforcement takes place solely between the two cargo doors at their interface. This positioning of the interlocking devices of that design necessitates the carrying of the extraneous hook and catch structure on door surfaces exposed to vehicle users when the doors are open. This is considered undesirable in certain applications.

Because of the shortcomings and the prior art, it is considered desirable that the cargo door reinforcement be provided which is integral with the door system and coacts with the vehicle body.

SUMMARY OF THE INVENTION

The desired advantages are realized in the present invention through providing a cargo door assembly that includes a pair of longitudinally spaced cargo doors pivotally mounted for movement between open and closed positions and having a latch assembly interlocking the two doors in which a vertical reinforcement beam is carried with one door and extends vertically from the latch to the bottom of the door and includes a hook portion which is received in an aperture in the vehicle body to resist inward movement of the door with respect to the body.

According to one aspect of the present invention, the reinforcement beam is provided in a fashion in which it is carried within one of the doors of the cargo door system.

BRIEF DESCRIPTION OF THE DRAWINGS

Other objects and features of the present invention will be apparent to those skilled in the automotive body arts upon reading the following description with reference to the accompanying drawings, in which:

FIG. 1 is a perspective view of a portion of the side of a van-type vehicle with one cargo door open;

FIG. 2 is an enlarged perspective view of a reinforcing beam according to the present invention.

DESCRIPTION OF THE PREFERRED EMBODIMENTS

Figure 3:
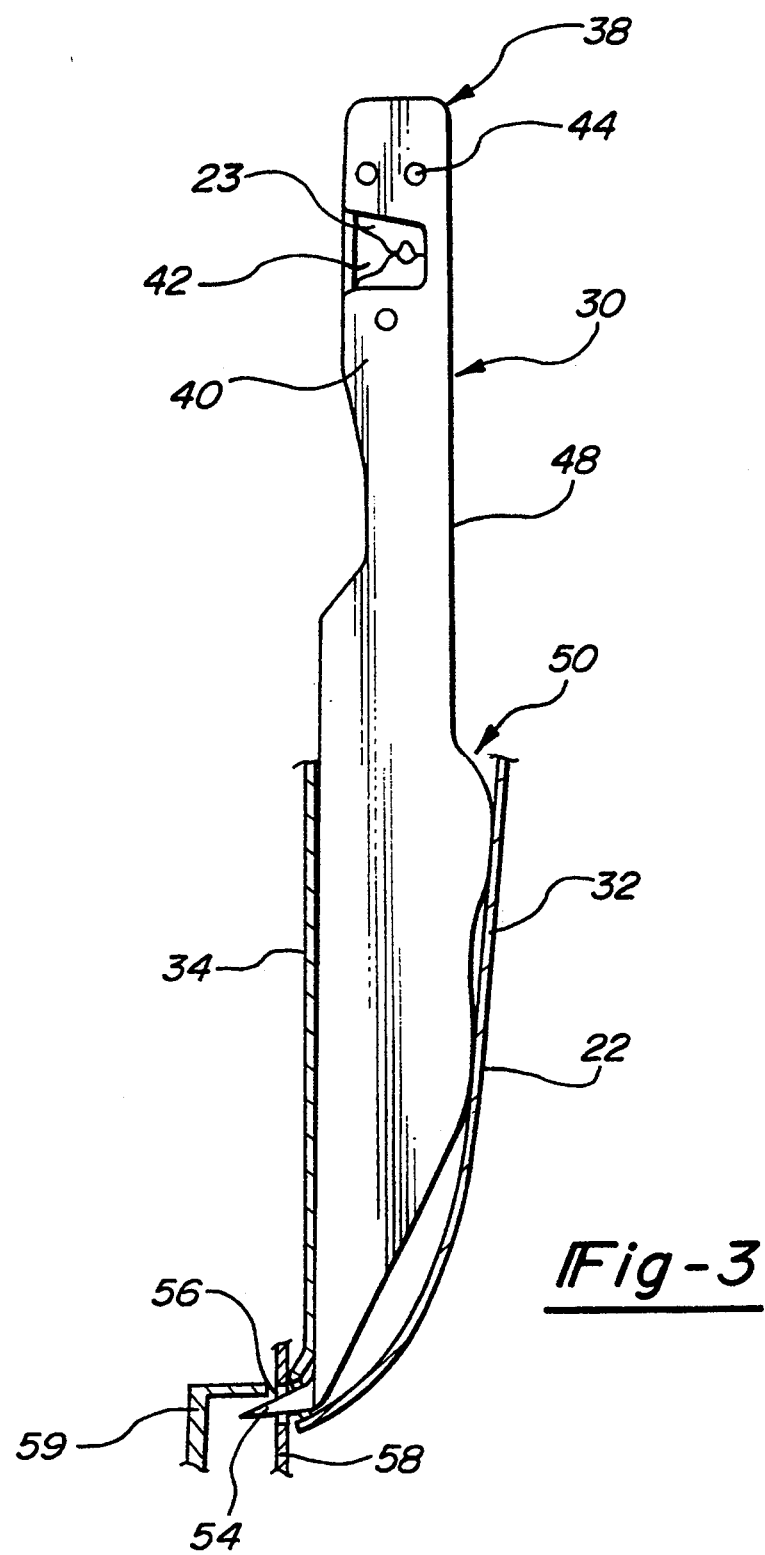
FIG. 3 is a side view of the reinforcing beam.

Turning now to drawings, and in particular to FIG. 1 thereof, a van indicated generally at 10 is illustrated as comprising a body 12 having an aperture 14 formed through its side 16, and a cargo door assembly indicated generally at 18 for closing the aperture 14. The cargo door assembly 18 is indicated as including a first door 20 and a second door 22 positioned rearwardly in the vehicle with respect to the first door. The first door 20 is preferably wider, that is, more longitudinal extent, than the second or rear door 22. The doors 20 and 22 are pivotally mounted on the vehicle body 12 in a known manner as through hinges for pivotal movement between open and closed position. The door 20 in FIG. 1 is illustrated in a partially open position.

As is customary, the doors 20, 22 are configured to be latchingly secured to each other when in the closed position by provision of a striker 24 projecting forwardly from the forward face 26 of the door 22 and a latch (shown generally at 23 in FIG. 3) carried on the trailing edge 28 of the door 20.

The forward door 20, according to the present invention, is modified from customary designs by provision of a reinforcing beam 30 carried with the door 20. The door 20 is otherwise of conventional construction, having an outer panel 32 and an inner panel 34. The outer panel 32 and the inner panel 34 are interconnected on the trailing edge 28 of the door 32 by a generally vertical panel 36, preferably formed as a flat panel interconnecting panels 32, 34.

The reinforcing beam 30 is carried between the outer panel 32 and the inner panel 34 and extends vertically from approximately the mid-vertical point of the door, and is preferably formed as a stamping and includes an upper end of generally L-shaped configuration indicated at 38 which has an upstanding wall 40 into which is formed a fish mouth slot 42 for receiving the striker 24. A plurality of apertures 44 are arrayed about the fish mouth 42 for conventional mounting of a latch of known design. The upstanding wall 40 is carried in abutting relationship with a forward surface of the end wall 36 of the door 20 and is preferably secured thereto by fixed mechanical means such as welding. At the upper end 38 of the reinforcing beam 30, a longitudinally extending wall 46 projects generally perpendicularly from the wall 40. The outer surface 48 of the wall 40 is configured to project laterally away from the wall 46 along the vertical extent of the beam 30 to form an enlarged bulbous portion 50 proximate the lower end of the beam 30. At the lower end 52 of the beam 30, a hook portion 54 is formed which projects generally laterally inwardly.

A slot 56 is formed in a lower sill portion 58 of the body 12 for receiving the hook portion 54. A reinforcing plate, which may be an L-shaped plate such as indicated at 58, loosely receives the hook portion 54 when inserted in slot 56.

Upon imposition of an excessive load on outer surfaces 60, 62 of front and rear doors 20, 22, respectively, the tendency of the doors to deflect inward toward the interior of the vehicle 10 is resisted in part by the reinforcement beam 30 which is carried as a simply supported beam between the latch striker 24 and the interaction of the hook portion 54 with the plate 58.

While only one embodiment of the cargo door assembly of the present invention has been described, others may be possible without departing from the scope of the appended claims.

What is claimed is:

1. A cargo door assembly for closing an aperture in the side of a vehicle body comprising:
    a first door hingedly connected to the body for movement about a hinge between an open position and a closed position;
    a second door hingedly connected to the body for movement about a second hinge between an open position and a closed position;
    a latch carried on one of the doors;
    a striker carried on the other of the doors for engagement with the latch;
    a reinforcing beam carried with the one door and extending vertically from the latch in longitudinal registration therewith to the bottom of the one door, the beam having a hook portion formed at its lower end projecting laterally inwardly toward the vehicle body; and
    means defining an aperture in the body in juxtaposition with the hook portion operative to resist inward movement of the door from the closed position with respect to the vehicle body.

2. A cargo door assembly as defined in claim 1 wherein the one door includes an inner panel and an outer panel carried in laterally spaced relationship and the reinforcing beam is carried intermediate inner and outer panels.

3. A cargo door assembly as defined in claim 1 wherein the latch is fixedly mounted adjacent the top of the reinforcing beam.

4. A cargo door assembly as defined in claim 1 wherein the reinforcing beam is formed to have an irregular cross section and is substantially greater in lateral thickness proximate the lower end of the reinforcing beam.

5. A cargo door assembly as defined in claim 4 wherein the reinforcing beam is formed as a stamping.

6. A cargo door assembly as defined in claim 2 wherein the one door includes a flat closure panel interconnecting the inner and outer panels and the reinforcing beam includes a flat panel fixedly secured the closure panel.

7. A cargo door assembly as defined in claim 6 wherein the reinforcing beam is formed to have an irregular cross section and is substantially greater in lateral thickness proximate the lower end of the reinforcing beam.

8. A cargo door assembly as defined in claim 7 wherein the reinforcing beam is formed as a stamping.

9. A cargo door assembly for closing an aperture in the side of a vehicle body comprising:
    a first door hingedly connected to the body for movement about a hinge between an open position and a closed position;
    a second door hingedly connected to the body for movement about a second hinge between an open position and a closed position;
    a latch carried on one of the doors;
    a striker carried on the other of the doors for engagement with the latch;
    a reinforcing beam carried with the one door and extending vertically from the latch in longitudinal registration therewith to the bottom of the one door, the beam having a hook portion formed at its lower end projecting laterally inwardly toward the vehicle body, the latch being fixedly secured adjacent the top of the reinforcing beam; and
    means defining an aperture in the body in juxtaposition with the hook portion operative to resist inward movement of the door from the closed position with respect to the vehicle body.

10. A cargo door assembly as defined in claim 9 wherein the reinforcing beam is formed to have an irregular cross section and is substantially greater in lateral thickness proximate the lower end of the reinforcing beam.

11. A cargo door assembly as defined in claim 10 wherein the reinforcing beam is formed as a stamping.

* * * * *